Dec. 9, 1969   H. SHAKESPEAR   3,482,656

DISC BRAKE CALIPER BODY

Filed June 21, 1968   2 Sheets-Sheet 1

INVENTOR.
Horacio Shakespear
BY
D. D. McGraw
ATTORNEY

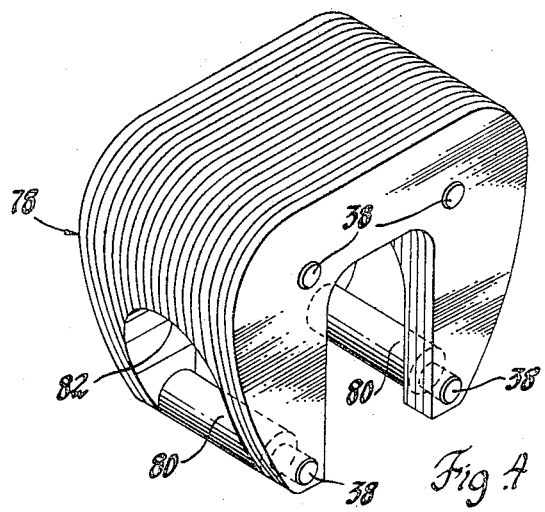
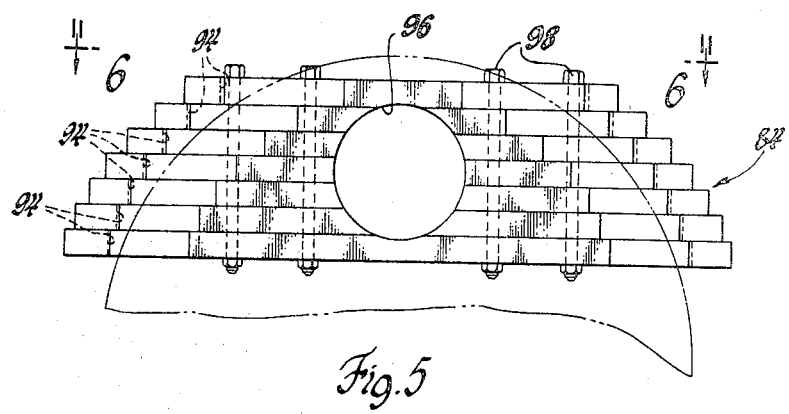
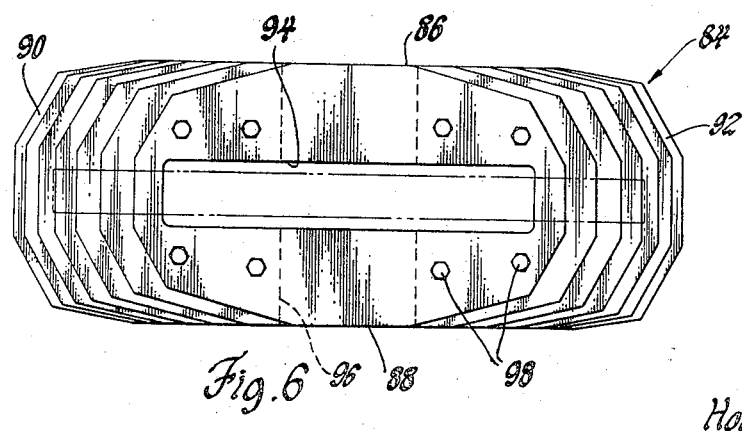

United States Patent Office 3,482,656
Patented Dec. 9, 1969

3,482,656
DISC BRAKE CALIPER BODY
Horacio Shakespear, Troy, Mich., assignor to General Motors Corporation, Detroit, Mich., a corporation of Delaware
Filed June 21, 1968, Ser. No. 738,971
Int. Cl. F16d 55/228, 65/84
U.S. Cl. 188—73                                    4 Claims

ABSTRACT OF THE DISCLOSURE

A disc brake caliper body made of laminations formed of sheet metal and assembled together in the required quantity and arrangement to provide the requisite caliper body strength and configuration. The caliper body may be a C-shaped clamp type or a closed loop chordal type. The body can be used in a sliding caliper disc brake assembly, a fixed caliper disc brake assembly, or a pivoting caliper disc brake assembly. Some or all of the laminations may be constructed so that they are positioned in spaced relation to provide cooling passages therebetween.

---

The invention relates to disc brakes and more particularly to a disc brake caliper body having a laminated construction. It is an objective of the invention to provide a caliper body which can be made from sheet metal stampings and assembled into a unitary structure, with the design of the structure being variable by selection of the desired number of sheet metal parts to provide the desired caliper resistance to deflection. Selection of types of sheet metal parts also permits several different arrangements of caliper body configuration while utilizing the same groups of parts. By using this type of construction, the same basic parts may form caliper bodies for small, light weight vehicles requiring small brake actuating mechanisms, or heavier vehicles requiring larger brake actuating mechanisms.

In the drawings:

FIGURE 4 is an isometric view of a modified disc brake caliper body embodying the invention;

FIGURE 5 is an elevation view of another disc brake caliper body modification embodying the invention; and FIGURE 6 is a view of the caliper body of FIGURE 5 taken in the direction of arrows 6—6 of that figure.

Figure 1:
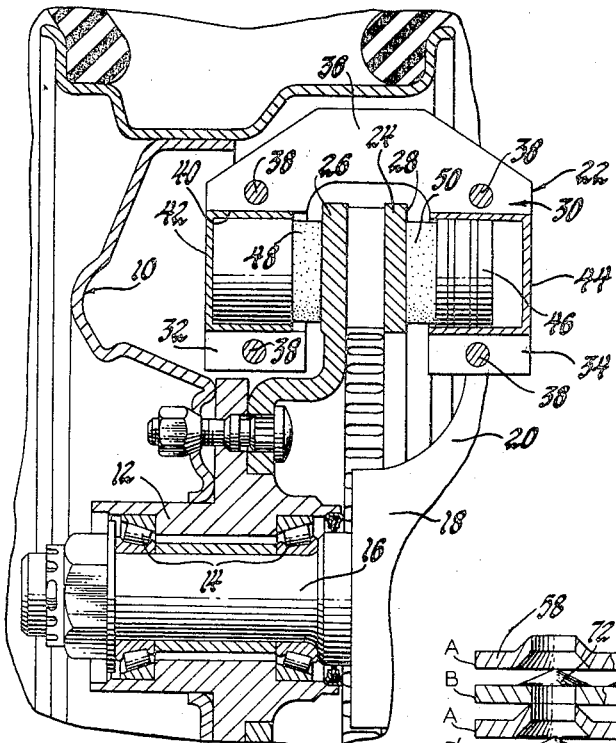
FIGURE 1 is a cross section view with parts broken away and showing a typical disc brake assembly including a caliper body embodying the invention.

In the disc brake assembly of FIGURE 1, a typical vehicle wheel 10 is mounted on a hub 12 which in turn is rotatably mounted by bearings 14 on a stub axle 16. The spindle 18 to which the stub axle is attached includes a mounting bracket 20 on which the disc brake caliper assembly 22 is suitably mounted. A brake disc 24 is secured to the hub 12 and is provided with opposed braking surfaces 26 and 28, in the usual manner. The caliper assembly 22 is illustrated as being a fixed caliper and includes a caliper body 30 which embodies the invention. The caliper body 30 is generally C-shaped and extends over the outer periphery of the disc 24 so that the body side sections 32 and 34 are positioned adjacent the disc braking surfaces 26 and 28, respectively. Caliper body section 36 joins the body side sections 32 and 34 and in combination therewith forms a unitary caliper structure. As will be further described, the caliper body 30 is made of sheet metal laminations which have the appearance of caliper body cross section slices. These laminations are secured together by suitable securing means 38 so that the laminations are joined to provide the unitary caliper body structure.

In the particular caliper construction shown, the body side sections 32 and 34 are provided with an opening 40 extending transversely therethrough and having hydraulic brake cylinders 42 and 44 mounted therein. A piston 46 is shown in cylinder 44, and a similar piston is provided in cylinder 42. Friction pads 48 and 50 are so positioned relative to the pistons and to the disc braking surfaces 26 and 28 that they engage the braking surfaces in braking relation when the brake actuating mechanism is pressurized. If the caliper assembly 22 is utilized as a sliding caliper or a pivoting caliper, one of the friction pads may be mounted on one of the caliper body side sections, with a cylinder and piston arrangement being used on only one caliper body side section.

Figure 3:
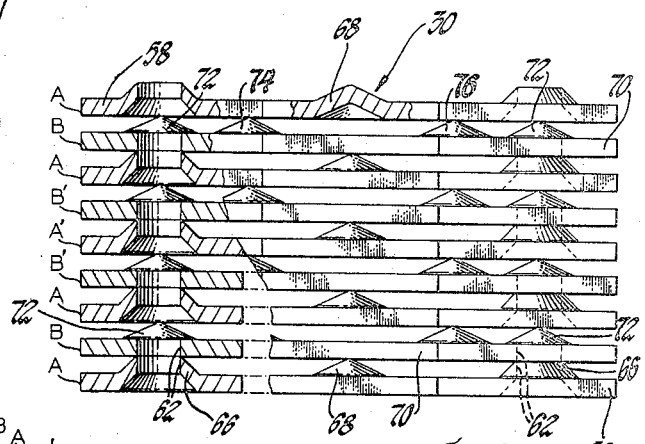
FIGURE 3 is a view taken in the direction of arrows 3—3 of FIGURE 2 and showing a lamination spacing arrangement.
Figure 2:
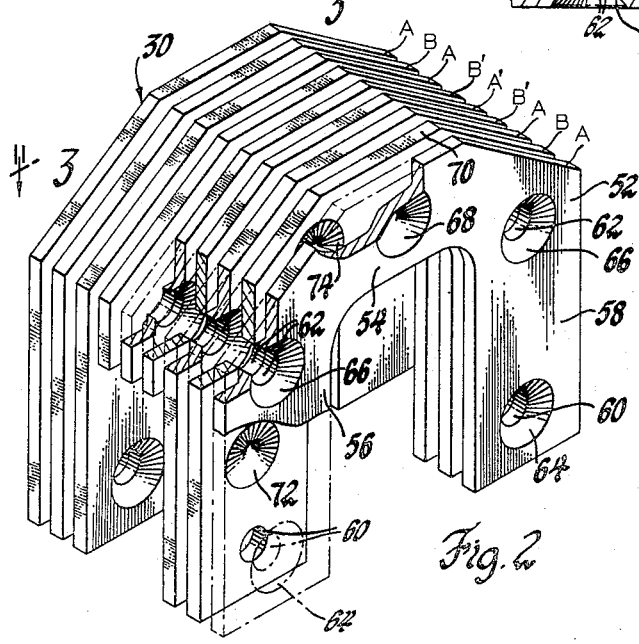
FIGURE 2 is an isometric view of the caliper body shown in FIGURE 1, with the lamination securing means being omitted for clarity and with parts broken away and in section.

FIGURE 2 shows the caliper body 30 in greater detail. Although the caliper body 30 may have laminations in direct surface contact with each other in the manner shown in FIGURE 4, the body is illustrated in FIGURES 2 and 3 as having spaced laminations. In the particular caliper body structure of FIGURES 2 and 3, two basic types of laminations are provided. These are identified as lamination types A and B. Also, two modified types of laminations are provided, and these are identified as types A' and B'. All of the type A laminations are substantially identical, as are all the type B laminations. In order to simplify production, the type A' laminations may be modified from the type A laminations by omitting portions thereof. The type B' laminations are similarly related to the basic type B laminations.

The particular caliper body of FIGURES 2 and 3 is formed by arranging laminations in the following order: A–B–A–B'–A'–B'–A–B–A. It can be seen that there are several groups of laminations. The type A and B laminations form one group, in this instance that group being divided into two sub-groups, one sub-group being on either end of the caliper body. The type A' and B' laminations form another group providing the center section of the caliper body.

A type A lamination, exemplified by lamination 52, has a center section 54 joining the two side sections 56 and 58, which extend from the center section in a C- or horseshoe-shaped manner. The lamination is stamped from sheet metal and may be made in large quantities at low cost. Lamination 52 has holes 60 extending through the outer portions of the side sections 56 and 58 and similar holes 62 extending through the lamination in the areas where the center section 54 joins the side sections 56 and 58. These holes, and similar holes in the other laminations, are provided to receive suitable securing means 38, such as bolts, shown in FIGURE 1, which hold the laminations together. Lamination 52 also has protuberances 64 formed with openings 60 at their apexes, and similar protuberances 66 formed with openings 62 at their apexes. These protuberances may be in the form of dimples struck outwardly from one side surface of the lamination. Another protuberance 68 is illustrated as being provided in the center of the center section 54 so that the protuberances 64, 66 and 68 are arranged in a particular pattern on lamination 52.

The type B laminations, exemplified by lamination 70, are initially stamped to have a form identical to that of the type A laminations. However, the differences are in the arrangement of the protuberances. Laminations 70 also have holes 60 and 62 formed therein, but these openings are not positioned within the confines of a protuberance. As can be seen in FIGURES 2 and 3, protuberances 72 are provided on type B lamination side sections so that they are misaligned relative to the protuberances 64 and 66 of the type A laminations. The type B laminations are provided with protuberances 74 and 76 on the lamination center section, and these are also misaligned relative to the type A protuberance 68. Therefore the type B protuberances 72, 74 and 76 form another pattern different from the type A protuberance pattern. This permits the protuberances on one lamination to engage a flat side surface on an adjacent lamination instead of fitting within the concave side of an aligned protuberance.

The type A' laminations are made by omitting the lower portions of the lamination side sections, immediately below the proteuberances 66. The type B' laminations are made by omitting a similar part of the side sections. This is done in order to provide an opening through the caliper body side sections for receiving the brake actuating mechanism. In a caliper body in which the opening is to extend through only one side section, the type A' and type B' laminations would have only one side section portion omitted.

While one particular protuberance pattern has been shown for type A and type A' laminations, and another particular protuberance pattern has been shown for type B and type B' laminations, other suitable patterns may be utilized. In some instances it may be desirable to provide protuberances only on the type A' and B' laminations, for example, or on only some of the other laminations, or any suitable combination thereof. In some brakes no protuberances at all may be required if the brakes are adequately cooled without spacing any laminations apart. In others only one protuberance pattern may be used, causing the laminations to have interlocking full surface contact.

While the caliper body 30 is illustrated as having three laminations in a first group of type A and type B laminations, three more laminations in a second group of type A' and type B' laminations, and three more laminations in another group of type A and type B laminations, the number of laminations within each group and the arrangement of the groups may be chosen to provide the most desirable caliper strength characteristics and configuration without requiring any different laminations.

The laminations may also have somewhat different shapes, a slightly modified shape of laminations being utilized in FIGURE 4. In that figure the laminations extending the full length of the side sections of the caliper body 78 are joined by securing means 38 at their outer ends, and a spacer 80 is provided on each such securing means. Such a spacer may also be utilized as a part of the caliper body 30 of FIGURES 2 and 3. Also, the laminations forming the center portion of the caliper body 78 have different amounts of their side section portions omitted so that the opening 82 assumes a curved shape. Other shapes of openings may be provided by design of the various laminations.

The caliper configuration shown in FIGURES 5 and 6 is of the closed loop type in which the caliper extends chordally about a portion of the disc. The caliper body 84 has side sections 86 and 88 which, when installed in an entire brake assembly, are positioned on opposite sides of the disc to be braked. The side sections extend beyond the periphery of the disc and their ends are joined by sections 90 and 92. This leaves a disc receiving slot 94 in the caliper body. The caliper laminations, seven being shown in this construction, are of a similar conformation, each having a sufficiently long disc receiving slot 94 to clear the disc, with the joining sections 90 and 92 being positioned outwardly of the disc periphery. An opening 96 is shown extending through the disc side sections to provide for mounting brake actuating mechanism. In a fixed caliper installation cooperating with an axially fixed disc, the brake actuating mechanism may be hydraulic cylinders positioned in both side sections. In a sliding or pivoting caliper arrangement, or a fixed caliper with sliding disc arrangement, a brake shoe may be appropriately secured to one side section of the caliper body and brake actuating mechanism provided on the other side section. The laminations making up the caliper body are held together by suitable fastening means such as the bolt and nut assemblies 98.

It has been found that a caliper made of a series of blank sheet metal pieces shaped to the caliper cross section, which presents a sliced caliper appearance, may be assembled so that the laminations or slices are secured together with only intermediate tension in the fastening means sufficient to hold the laminations in a unitary structure. Thus the laminations may be easily removed and replaced, additional laminations may be added, or different types of laminations may be used in different arrangements, according to the particular brake installation needs. Brake calipers of this type have been found to have excellent deflection resistance. When caliper bodies are constructed with appropriate protuberances which space the laminations or slices slightly apart, a much greater cooling effect is obtained. Not only does cooling air flow over the cooling pads but, when the laminations forming complete caliper side sections are also spaced apart, the friction pad backing plates are also directly exposed to cooling air. This results in better heat removal and therefore more satisfactory braking. This is particularly important in heavy duty installations.

What is claimed is:

1. In a disc brake caliper body having opposed side sections adapted to extend over opposite brake surface sections of a disc to be braked, and means arranged to extend peripherally outwardly and across the disc and joining said side sections and transmitting brake reaction forces between said side sections, the improvement wherein said caliper body is formed of a plurality of laminations at least some of which provide parts of said side sections and said joining sections, and means holding said laminations in a unitary juxtaposed relationship to provide the caliper body structure, said laminations having portions struck out and extending outwardly from the plane surfaces thereof and arranged when assembled into a unitary caliper body to space said laminations apart to permit cooling currents of air to flow therebetween.

2. A disc brake caliper body having opposed side sections and being constructed of first and second type groups of sheet metal laminations secured together, the selection of the number of laminations in each group being a function of the strength of each lamination and the caliper brake applying forces required to be transmitted through the caliper body, and the selection and arrangement of the groups of laminations and the arrangement of the laminations within the groups being a function of caliper body configuration for mounting brake actuating mechanism, said first type group of laminations having each lamination therein provided with a portion forming a part of said opposed side sections, and said second type group of laminations having each lamination therein omitting at least a part of such a lamination portion so that an opening is provided in at least one of the caliper body opposed side sections for mounting brake actuating mechanism therein, at least some of said laminations having means formed thereon extending from at least one side surface thereof and cooperating with adjacent laminations to position said laminations in spaced relation, thereby providing brake cooling passages between the spaced laminations.

3. The disc brake caliper body of claim 2, said laminations being of two basic types A and B forming said first type group in alternate interleaved arrangement, said laminations also including two modified lamination types A' and B' forming said second type group in alternate interleaved relation, said lamination types A' and B' being substantially identical to the respective lamination types A and B except for having portions thereof omitted to provide the caliper body opposed side section opening, with the sides of the opening defined by lamination groups having lamination types A and B therein, said means formed on at least some of said laminations being protuberances, said lamination modified type A' having said protuberances projecting outwardly of one side surface thereof in one pattern and said lamination modified type B' having said protbuerances projecting outwardly of one side surface thereof in another pattern different from the one pattern so that adjacent different lamination modified types have their protuberances non-aligned and engaging flat surfaces of the adjacent laminations, thereby maintaining cooling spaces between the modified type laminations.

4. The disc brake caliper body of claim 3, said basic lamination types A and B also having said protuberances projecting outwardly of one side surface thereof in respectively different patterns including the respective patterns of lamination types A' and B' so that each lamination forming a part of the caliper body is adjacent to a lamination having a different pattern of protuberances from its pattern of protuberances whereby cooling spaces are also maintained between lamination types A and B.

References Cited

UNITED STATES PATENTS

| | | | |
|---|---|---|---|
| 3,035,664 | 5/1962 | Desvignes | 188—73 |
| 3,062,329 | 11/1962 | Erickson | 188—73 |
| 3,158,230 | 11/1964 | Chouings. | |
| 3,195,687 | 7/1965 | Thirion | 188—73 |

GEORGE E. A. HALVOSA, Primary Examiner

U.S. Cl. X.R.

188—264